US009596354B2

(12) United States Patent
Jeon (10) Patent No.: US 9,596,354 B2
(45) Date of Patent: Mar. 14, 2017

(54) METHOD AND SYSTEM FOR PROVIDING RING BACK TONE PLAYED AT A POINT SELECTED BY USER

(71) Applicant: RealNetworks Asia Pacific Co., Ltd., Seoul (KR)

(72) Inventor: Yun Ho Jeon, Seoul (KR)

( * ) Notice: Subject to any disclaimer, the term of this patent is extended or adjusted under 35 U.S.C. 154(b) by 194 days.

(21) Appl. No.: 14/268,884

(22) Filed: May 2, 2014

(65) Prior Publication Data

US 2014/0321332 A1 Oct. 30, 2014

Related U.S. Application Data

(63) Continuation of application No. 12/296,088, filed as application No. PCT/KR2007/001421 on Mar. 23, 2007, now Pat. No. 8,718,256.

(30) Foreign Application Priority Data

Mar. 24, 2006 (KR) .................... 10-2006-0027008

(51) Int. Cl.
*H04M 7/12* (2006.01)
*H04M 3/42* (2006.01)

(52) U.S. Cl.
CPC ....... *H04M 7/129* (2013.01); *H04M 3/42017* (2013.01); *H04M 3/42161* (2013.01); *H04M 2203/306* (2013.01)

(58) Field of Classification Search
CPC ....... H04M 2203/306; H04M 3/42017; H04M 3/42161; H04M 7/129

(Continued)

(56) References Cited

U.S. PATENT DOCUMENTS 5,454,723 A * 10/1995 Horii ................. G09B 5/065
348/484
5,642,477 A * 6/1997 de Carmo ......... G06F 17/30017
707/E17.009

(Continued)

FOREIGN PATENT DOCUMENTS

JP 61214656 9/1986
JP 2000354087 12/2000

(Continued)

OTHER PUBLICATIONS

International Search Report and Written Opinion for PCT/KR2007/001421, mailed Jul. 3, 2007.

(Continued)

*Primary Examiner* — Jung Park
*Assistant Examiner* — Mahmudul Hasan
(74) *Attorney, Agent, or Firm* — Kory D. Christensen; Stoel Rives LLP (57) ABSTRACT

Disclosed herein is a method and system for providing a ringback tone (RBT). The system for providing an RBT to a user comprises: a sound file storage for storing a sound file; a user database receiving sound selection information from a user terminal, recording a sound identifier of the sound file corresponding to the sound selection information, receiving output position information of the selected sound file from the user terminal, and recording the sound position information; and an RBT providing unit reproducing a region which corresponds to the output position information from the sound file corresponding to the sound identifier with reference to the sound file storage and the user database so as to be provided as an RBT.

16 Claims, 6 Drawing Sheets

(58) Field of Classification Search
USPC ............ 370/259; 455/414.1, 466; 379/88.17, 379/207.16
See application file for complete search history.

(56) References Cited

U.S. PATENT DOCUMENTS

| | | | | | |
|---|---|---|---|---|---|
| 5,703,997 | A * | 12/1997 | Kitamura | ............... | G11B 19/02 375/E7.267 |
| 7,411,984 | B1 * | 8/2008 | Moth | ...................... | H04L 12/66 370/298 |
| 8,718,256 | B2 | 5/2014 | Jeon | | |
| 2002/0027976 | A1 * | 3/2002 | Wilcox | ................ | G11B 27/105 379/67.1 |
| 2004/0114732 | A1 * | 6/2004 | Choe | ....................... | H04M 3/02 379/88.17 |
| 2004/0132435 | A1 * | 7/2004 | No | .................... | H04M 3/42017 455/414.1 |
| 2005/0094638 | A1 * | 5/2005 | Holm | .................. | G10H 1/0058 370/389 |
| 2005/0170865 | A1 * | 8/2005 | Harvej | ................ | H04M 19/041 455/567 |
| 2005/0207555 | A1 * | 9/2005 | Lee | .................. | H04M 3/42017 379/207.16 |
| 2006/0028951 | A1 * | 2/2006 | Tozun | ...................... | G11B 3/64 369/84 |
| 2006/0079295 | A1 * | 4/2006 | Chan | .................... | H04M 19/04 455/567 |
| 2006/0106852 | A1 * | 5/2006 | Siddall | .............. | G06F 17/30147 |
| 2006/0109968 | A1 * | 5/2006 | Hahm | .................. | H04M 3/42017 379/207.16 |
| 2006/0116142 | A1 * | 6/2006 | Cofta | .................... | H04L 12/587 455/466 |
| 2006/0126815 | A1 * | 6/2006 | Hahm | ............... | H04M 3/42017 379/252 |
| 2006/0199646 | A1 * | 9/2006 | Kogo | ..................... | A63F 13/12 463/43 |
| 2006/0282485 | A1 * | 12/2006 | Aggarwal | ......... | G06F 17/30138 |
| 2006/0291640 | A1 * | 12/2006 | Nagesh | .................... | H04M 3/02 379/211.02 |
| 2006/0293089 | A1 * | 12/2006 | Herberger | ........... | G10H 1/0025 455/567 |
| 2007/0014314 | A1 * | 1/2007 | O'Neil | ................ | H04L 67/1095 370/503 |
| 2008/0025491 | A1 * | 1/2008 | Park | .................. | H04M 3/42017 379/207.16 |
| 2008/0175231 | A1 * | 7/2008 | Horikoshi | ........... | H04L 65/1006 370/352 |

FOREIGN PATENT DOCUMENTS

| | | |
|---|---|---|
| JP | 2003274016 | 9/2003 |
| JP | 2004221814 | 8/2004 |
| JP | 2004361845 | 12/2004 |
| JP | 2005049692 | 2/2005 |
| KR | 1020040050575 A | 6/2001 |
| KR | 1020020097044 | 12/2002 |
| KR | 1020020097051 A | 12/2002 |
| KR | 1020020097075 A | 12/2002 |
| KR | 1020060007089 | 1/2006 |
| TW | 573292 | 1/2004 |

OTHER PUBLICATIONS

Office Action mailed Nov. 23, 2011, in U.S. Appl. No. 12/296,088.
Office Action mailed Mar. 14, 2012, in U.S. Appl. No. 12/296,088.
Notice of Allowance mailed Mar. 3, 2014, in U.S. Appl. No. 12/296,088.

* cited by examiner

METHOD AND SYSTEM FOR PROVIDING RING BACK TONE PLAYED AT A POINT SELECTED BY USER

TECHNICAL FIELD

The present invention relates to a method and system for providing a ringback tone (RBT), and more particularly, to a method and system for providing an RBT, in which output position information from the sound file and sound file information which are selected by a user are stored in a user database, and a region corresponding to the output position information in the sound file, formed in units of song pieces, is reproduced so as to be provided as an RBT with reference to the user database.

BACKGROUND ART

Currently, a ringback tone (hereinafter, referred to as "RBT") service providing an RBT during call switching between user terminals has been widely used due to developments in communication technology. In conventional RBT services, one of RBT sounds, having been registered by selectively editing portions of fundamental notes of song pieces by a content provider, is selected by a user so as to be used as an RBT of the user. As a result, there occurs a problem in that a user should select sounds only in the limited region that has been selected by the content provider among total song pieces.

Figure 1:
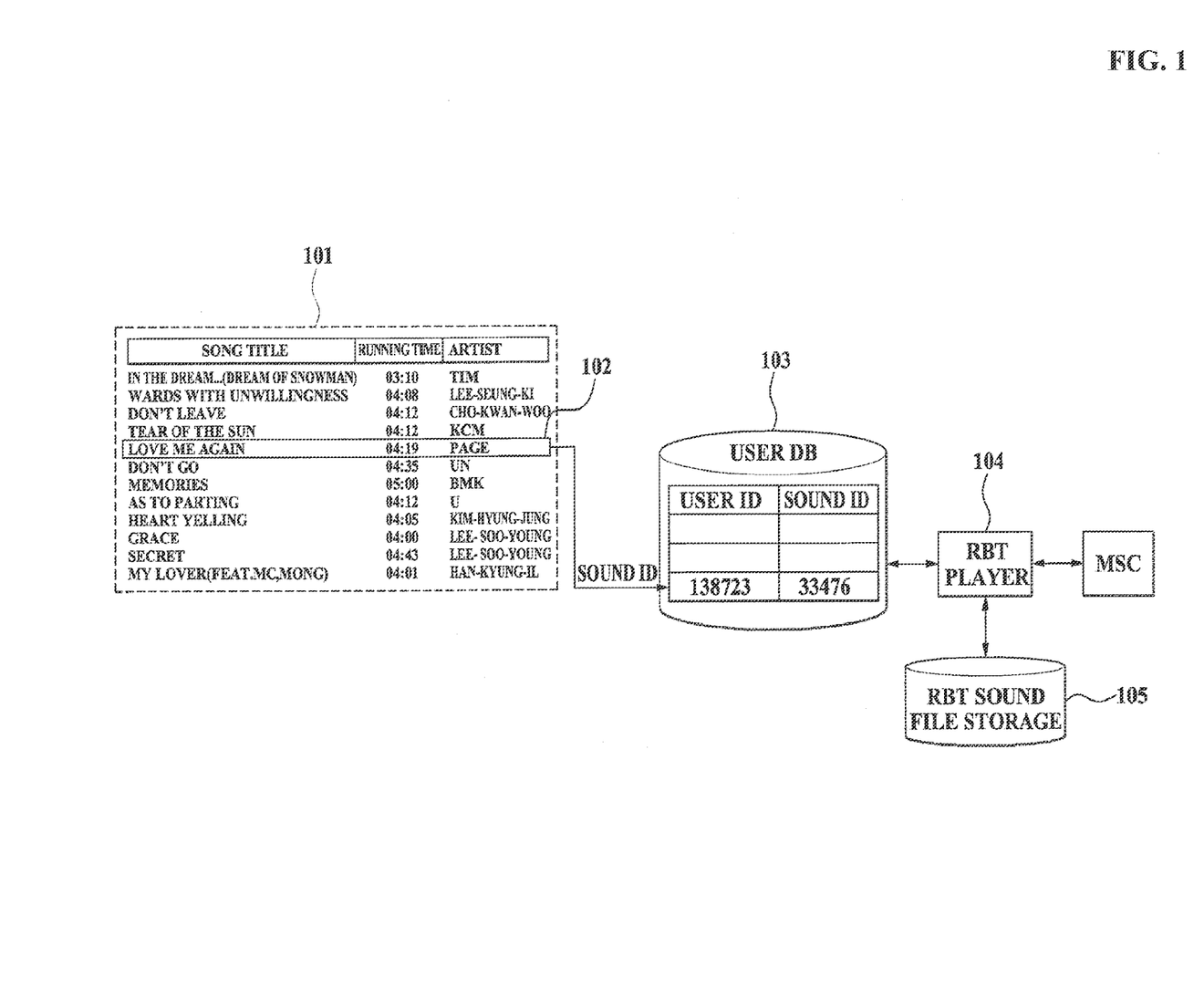
FIG. 1 illustrates a procedure for providing an RBT in a conventional RBT providing system.

FIG. 1 illustrates a procedure for providing an RBT in a conventional system for providing an RBT. As shown in FIG. 1, when a user selects a specific sound file 102 from a predetermined web page 101 as an RBT, the system for providing an RBT records a user identifier and a sound file identifier selected by the user in a user database 103.

When an RBT is reproduced by performing call switching in a user terminal to which an RBT is intended to be provided, an RBT player 104 reads and reproduces the sound file corresponding to the sound identifier selected by the user in an RBT sound file storage 105 with reference to the user database 103.

However, since a typical RBT has been provided for several tens of seconds in comparison with the case that the whole sound is provided for several minutes or more in the conventional RBT service as described above, a user must use only a part of the sound having been selected and registered as an RBT by a content provider. Thus, diversified requests of a user is not satisfied, and a part of the sound must be selected and registered as an RBT by the content provider, and accordingly, costs required for the RBT providing service such as labor costs for editing of the content provider, etc. may be increased.

Further, a plurality of services have been activated, which sound files of several hundred thousands or more are secured so as to be provided to a user in a compressed form such as Moving Picture Experts Group Layer-3 Audio (MP3), Advanced Audio Coding (AAC), etc. In this way, in certain services, a function in which a part of the song that a user wishes is selected and downloaded as his or her ring tone (e.g., "cutting bell" service). Similarly, in the case of an RBT, there has been suggested a need for a function in which parts that a user wishes from total song pieces are selected and used as his or her RBT. However, in the conventional RBT system, there is a problem in which data storage volume required for satisfying the function as described above is significantly increased.

For example, in the case where a sound having been registered by a content provider is provided to a user in the conventional art, when a sound file is in a form of a 32 Kbps Adaptive Differential Pulse Code Modulation (ADPCM) format and is 40 seconds in length, with a number of registered sound files as one hundred thousand, data storage volume required for storing all sound files will reach 16 GB. However, in the case where a user uses sound files of regions selected by the user himself or herself as an RBT, when the number of users is two million, the number of sounds selected by the users is on average two per user, and other assumptions are the same with the previous case, data storage volume required for a service of providing a sound selected by a user will be geometrically increased to 640 GB.

Accordingly, in order to provide the service of providing the sound selected by the user, data storage volume being about forty times larger than that of the conventional sound service is required, thereby significantly increasing costs for the service. Also, there is a shortcoming in which the larger the sound volume stored in a storage means becomes, caching efficiency of an RBT player becomes large, whereby the RBT cannot be reproduced on time, or sound is cut while being reproduced.

Therefore, there is a need for a method and system for providing an RBT, in which a sound of an output position selected by a user is provided as an RBT while data storage volume required for storing sound files is being significantly reduced by improving shortcomings as described above.

DISCLOSURE OF INVENTION

Technical Goals

An aspect of the present invention provides a method and system for providing an RBT, in which a region selected by a user from the sound file selected by the user is provided as an RBT, as well as a sound file of the region selected by the user is not additionally stored, so that data storage volume required for providing the RBT can be significantly reduced.

Another aspect of the present invention provides a method and system for providing an RBT, in which fade-in effect is reproduced in real-time while a specific region of a sound file is provided as an RBT by reducing the data storage volume, so that the RBT is provided to a user without making the user feel displeasure or surprised.

Still another aspect of the present invention provides a method and system for providing an RBT, in which a predetermined section is reproduced from a packet unit that is closest to the output position among the sound files so as to be provided as an RBT, so that random access is available even in the file in which independent sample data is not recorded in a byte unit.

Yet another aspect of the present invention also provides a method and system for providing an RBT, in which many users are induced to select the same output position by recommending an output position and a shared sound file is generated and commonly managed, so that data storage volume required for providing an RBT is reduced.

Another further aspect of the present invention also provides a method and system for providing an RBT, in which when the number of users using a shared sound file is decreased, the shared sound file is either deleted or set as a file to be preferentially deleted, so that data storage volume required for providing an RBT is reduced.

Technical Solutions

According to an aspect of the present invention, there is provided a system for providing a ringback tone (RBT) to a user, the system comprising a sound file storage for storing a sound file; a user database receiving sound selection information from a user terminal, recording a sound identifier of the sound file corresponding to the sound selection information, receiving output position information of the selected sound file from the user terminal, and recording the sound position information; and an RBT providing unit reproducing a region which corresponds to the output position information from the sound file corresponding to the sound identifier with reference to the sound file storage and the user database so as to be provided as the RBT.

According to another aspect of the present invention, there is provided a system for providing an RBT to a user, the system comprising a user database transmitting recommended output position information of a sound file to a user terminal and recording a user identifier of users having selected the same recommended output position information; and an RBT providing unit generating a region corresponding to the same recommended output position information from the sound file as a shared sound file to be stored in the sound file storage, and providing the shared sound file to the RBT of users having selected the same recommended output position information, with reference to the user database and the sound file storage.

Also, according to another aspect of the present invention, there is provided a method for providing an RBT to a user, the method comprising storing a sound file in a sound file storage; receiving sound selection information from a user terminal and recording a sound identifier of a sound file corresponding to the sound selection information in a user database; receiving output position information of the selected sound file from the user terminal and recording the received output position information in the user database; and reproducing a region which corresponds to the output position information from the sound file corresponding to the sound identifier with reference to the sound file storage and the user database so as to be provided as the RBT.

Further, according to another aspect of the present invention, there is provided a method for providing an RBT to a user, the method comprising transmitting recommended output position information of a sound file to a user terminal and recording a user identifier of users in the user database, the user having selected the same recommended output position information; generating a region which corresponds to the same recommended output position information from the sound file as a shared sound file to be stored in a sound file storage; and providing the shared sound file to the RBT of users who select the same recommended output position information with reference to the user database and the sound file storage.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
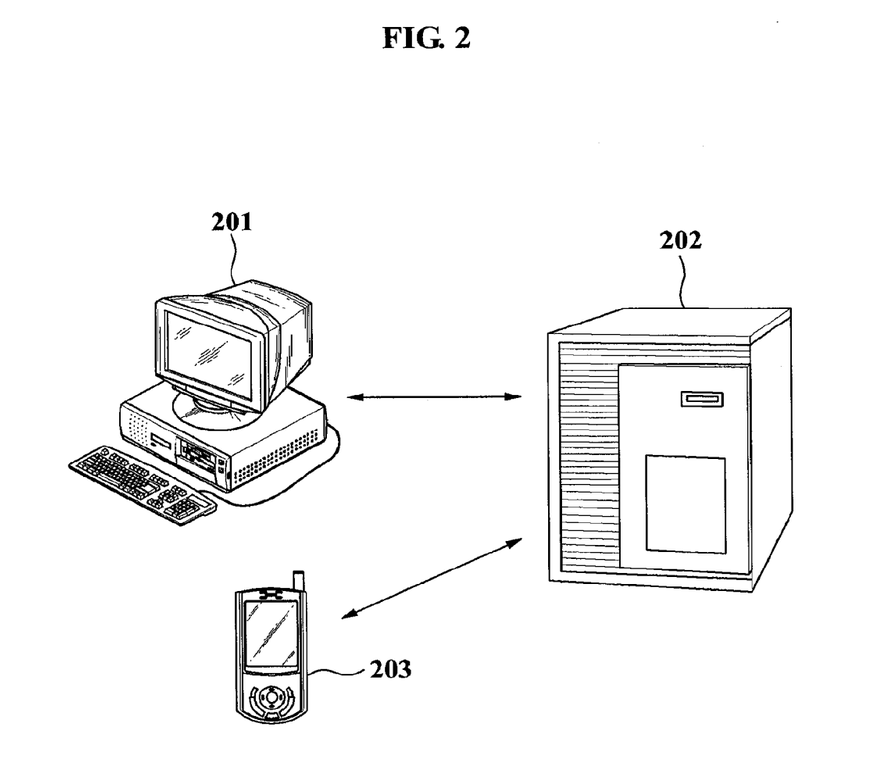
FIG. 2 illustrates a networking diagram of an RBT providing system according to an exemplary embodiment of the present invention.

FIG. 2 illustrates a networking diagram of an RBT providing system according to an exemplary embodiment of the present invention. A user terminal 201 is connected with a RBT providing system 202 through a wired/wireless network. The RBT providing system 202 provides a predetermined region of a sound file selected by a user via the user terminal 201 as an RBT of a communication terminal 203. The user terminal 201 of the present invention includes all means by which a user interface being capable of allowing a user to select a predetermined region of a sound file is provided, and the communication terminal 203 includes all means by which an RBT is provided to a user. Thus, the user terminal 201 or the communication terminal 203 may be an equivalent means according to examples of the present invention.

For reference, the "user terminal" or "communication terminal" used in the present invention is a portable electronic/electric device referring to all sorts of wireless communication devices base on handheld which include a Personal Digital Cellular (PDC) phone, a Personal Communication Service (PCS) phone, a Personal Handyphone System (PHS) phone, a Code Division Multiplexing Access (CDMA-2000) (1×, 3×) phone, a Wideband CDMA (WCDMA) phone, a Dual Band/Dual Mode phone, a Global Standard for Mobile (GSM) phone, a Mobile Broadband System (MBS) phone, a Digital Multimedia Broadcasting (DMB) terminal, a Smart phone, an Orthogonal Frequency Division Multiplexing (OFDM) communication terminal, an apparatus including telecommunication function such as an Orthogonal Frequency Division Multiple Access (OFDMA) communication terminal, etc., a portable terminal such as a Personal Digital Assistant (PDA), a Hand-Held PC, a notebook computer, a laptop computer, a WiBro terminal, an MP3 player and MD player, etc., and an International Mobile Telecommunication (IMT)-2000 terminal providing roaming service and expanded mobile telecommunication services. Also, the user terminal or the communication terminal may include a predetermined communication module such as wireless communication device on which global positioning system (GPS) chip is mounted so as to be capable of position tracking through an OFDMA module, a CDMA module, a Bluetooth module, an infrared Data Association (IrDA) module, a wired/wireless LAN card, and a GPS module, and may be interpreted as a generic term for terminals being capable of performing certain arithmetic operations by mounting a microprocessor therein.

Figure 3:
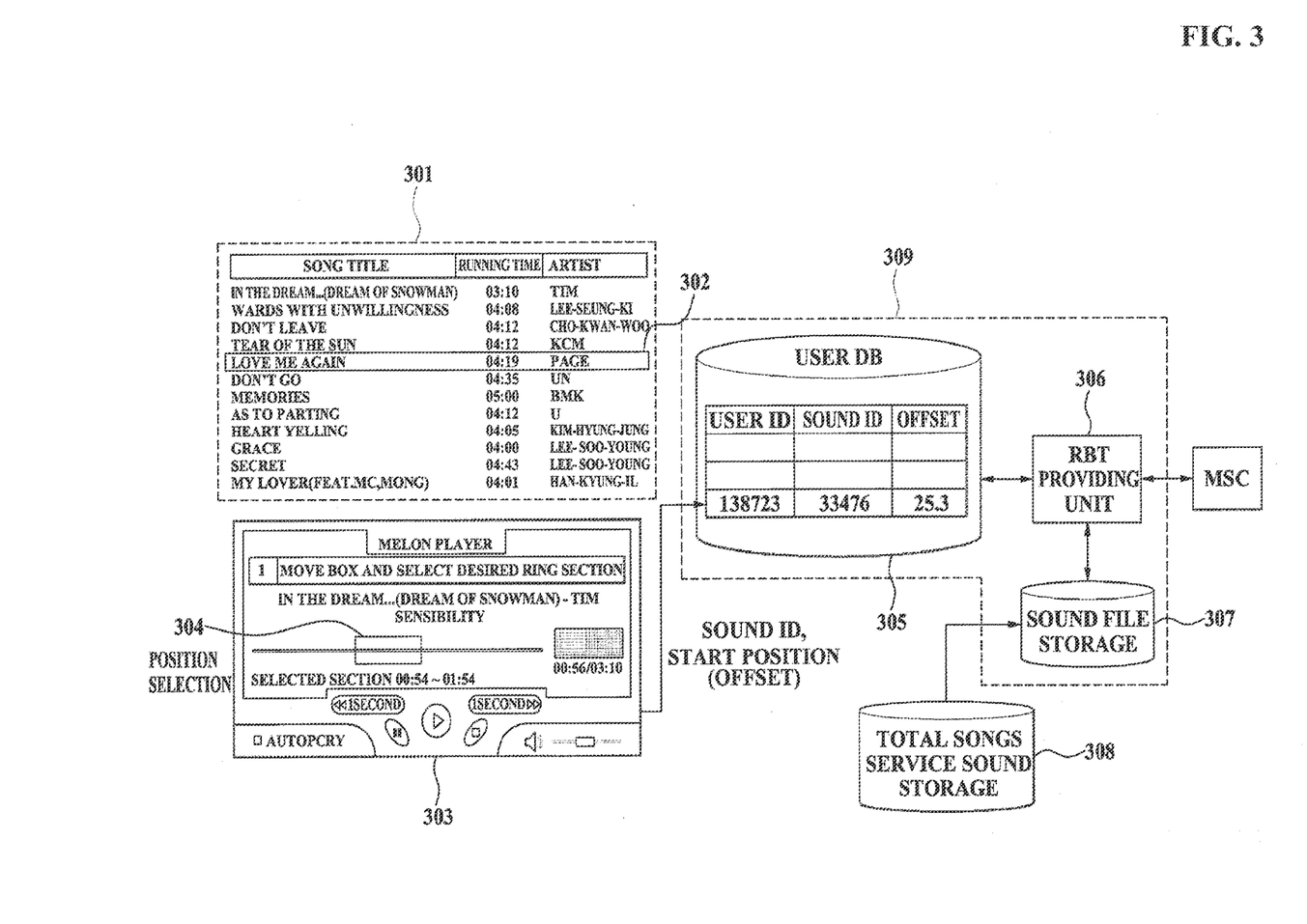
FIG. 3 illustrates a procedure for providing an RBT according to an exemplary embodiment of the present invention.

FIG. 3 illustrates a procedure for providing an RBT according to an exemplary embodiment of the present invention. Referring to FIG. 3, the RBT providing system of the present invention provides a user interface 301 permitting a user to select one sound among many sounds as an RBT to the user terminal. The user interface 301 is either provided from an RBT providing system 309 or provided by being included in network-linked web pages.

When a user selects a desired sound in the user interface 301, sound selection information is generated in the user terminal so as to be transmitted to the RBT providing system 309. The sound selection information may include user identifier information and identifier information of a sound file selected by the user.

The RBT providing system 309 receives sound selection information from the user terminal, and records a sound identifier of a sound file corresponding to the sound selection information in the user database. The "database" or "storage" of the present invention refers to a general idea including all kinds of means being capable of recording data, or maintaining or storing data.

For example, in the case where a user corresponding to a user identifier "138723" selects "DON'T GO" of "Yoo-Jin" as an RBT in the user interface, the RBT providing system 309 receives the user identifier "138723" and a sound identifier "33476" and records in the user interface 305.

Furthermore, in the RBT providing system 309 according to the present invention, when a user selects a sound, the user interface being capable of allowing the user to select an output position of the sound is outputted on the user terminal, so that the user can select the user's desired output position. That is, the user can select a desired output region from a sound file by moving a box-shaped bar.

For example, the user selects a section of 25.3 to 55.3 seconds from among the entire sound of 4 minutes 35 seconds as an output position.

In this instance, when the user selects only an output start position in the user interface, a predetermined region from the output start position may be set as an output position. Also, when the user selects both an output start position and an output end position, a predetermined region between the output start/end positions is set as an output position. In the cases as described above, when an error is occurred in setting the position due to the unskilled operation of the user, a step for pre-treating for conducting optimal sensitivity correction to an accurate position may be additionally included by detecting a property such as the change of sound volume.

When a user selects an output position from a sound file, the RBT providing system of the present invention receives the output position information of the sound file selected from the user terminal, and records the received output position information in the user database.

For example, an output start position of 25.3 seconds in a sound file is received as the output position information so as to be recorded in the user database 305.

The RBT providing system according to the present invention stores a plurality of sound files in units of song pieces in a sound file storage 307. When an RBT is provided to a communication terminal of a user, the RBT providing system of the invention reproduces a region which corresponds to the output position information from the sound file corresponding to the sound identifier with reference to the sound file storage and the user database so as to be provided as the RBT.

For example, When an RBT is provided to a communication terminal of a user corresponding to a user identifier "138723", an RBT providing unit of the RBT providing system of the invention reads 25.3 seconds of an output position information of the sound corresponding to a sound identifier "33476" with reference to the user database, and reproduces a predetermined region from the sound position of the sound file corresponding to the sound identifier in the sound file storage so as to be provided as an RBT.

Here, the RBT providing system determines whether the sound file selected by a user is stored in the sound file storage, and downloads the selected sound file from a total song storage 308 in which sound files selected by the user are stored, by transmitting a transmission request to the total song storage 308 when the selected sound file is not stored in the sound file storage.

Thereafter, the RBT providing system converts the selected sound file into a predetermined format being capable of outputting (e.g., ADPCM) to store in the sound file storage, and provides the converted sound file as an RBT with reference to the sound file storage.

Thus, in accordance with RBT providing system of the present invention, a region selected by a user from the user's desired sound file is provided as an RBT, and a sound file of a desired region of the user is not additionally stored, so that data storage volume required for providing an RBT is significantly reduced.

For example, in the case where 95% of users among 2,000,000 users using sound files set in such a manner as to differ only in an output start position from among 30,000 popular songs, and the remaining 5% of users respectively set the sound, when respective sound files has 300 seconds average running time, and in a form of a 32 Kbps ADPCM format, a data storage volume required for providing an RBT service is 156 GB. As a result, enables the RBT service to be provided with ¼ data storage volume in comparison with that of a method in which sound of a region selected by a user is individually stored.

Also, in the case where a certain region of a sound file is used as an RBT sound, when a sound file is abruptly reproduced at a given sound volume, a user may, feel discomfort or surprised. Accordingly, fade-in effect is applied so as to gradually increase the sound volume in a beginning part of a certain region. According to the present invention, since a sound is stored in units of song pieces in the sound file storage and the output position selected by a user is reproduced in order of reduction of data storage volume, fade-in effect is produced in real-time so as to be provided as an RBT by applying a fade-in filter to a region corresponding to the output position information.

Figure 4:
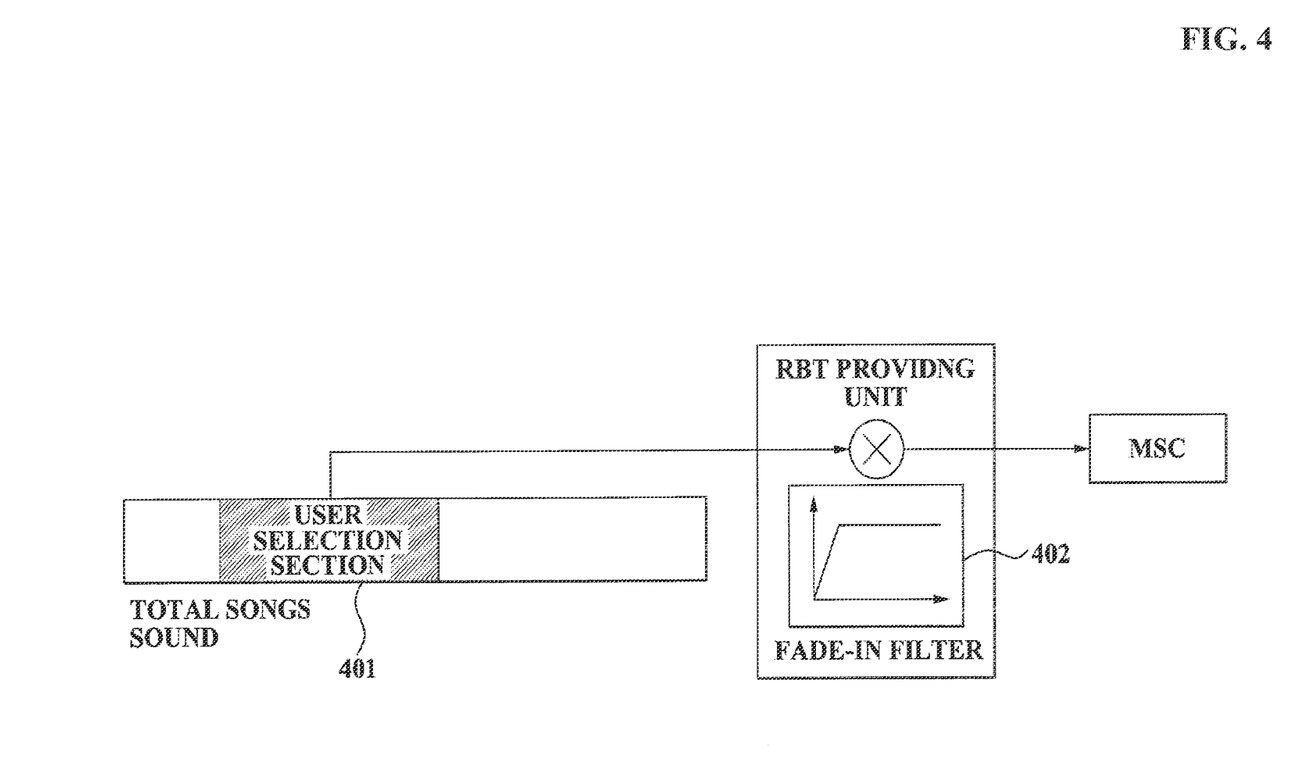
FIG. 4 illustrates that a fade-in filter is applied to a region corresponding to output position information according to an exemplary embodiment of the present invention.

FIG. 4 illustrates that a fade-in filter is applied to a region corresponding to output position information according to an exemplary embodiment of the present invention. Referring to FIG. 4, the RBT providing system of the invention applies a fade-in filter 402 to a region 401 corresponding to the output position information selected by a user among sound files, so that fade-in effect can be given to be reproduced as an RBT.

Thus, in accordance with the RBT providing system of the present invention, fade-in effect is produced in real-time while a certain region of a sound file is provided as an RBT by significantly reducing data storage volume, whereby the RBT is provided to a user without making the user feel discomfort or surprise.

On the other hand, in accordance with the RBT providing system of the present invention, data is reproduced from the output position selected by a user among sound files formed in units of song pieces. In the case where a sound file is in a form of a liner Pulse Code Modulation (PCM) format, a μ-law or A-law file, those in which each independent sample data is recorded in units of bytes or words, data is read and reproduced from an arbitrary position. However, in the case where a sound file is a file in a form such as an ADPCM format using a decoder having a state, when data is reproduced from an arbitrary position, an abnormal sound may be reproduced. Still, in the case where a μ-law or A-law file, which is different from the ADPCM format, is used as a sound file, the size of the sound file is two times larger than that of the ADPCM format, thereby decreasing the volume effect.

Accordingly, in accordance with the RBT providing system of the present invention, the sound file is identified by a "packet" unit which designates the sample units of the certain number constituting a sound file (64 samples in the case of Apple's Audio Interchange File (IMA) format, the number specified on the header in the case of Windows' IMA format). A predetermined region is reproduced from the start point of a packet unit which is the closest to the output position among sound files so as to be provided as an RBT, so that random access can be available in a file in a form of the ADPCM format in which each independent sample data is not recorded in units of bytes.

Also, although output position of an RBT is selected for each user, adequate output position may converge into several commensurate positions upon using the same sound file. Thus, the RBT providing system of the present invention can recommend an adequate output position to a user, and separately manage sound files selected by users.

To this end, the RBT providing system according to the present invention transmits recommended output position information of the sound file corresponding to the sound selection information to a user terminal, receives the recommended output position information selected by the user from the user terminal so as to be recorded in the user database as the output position information.

Figure 5:
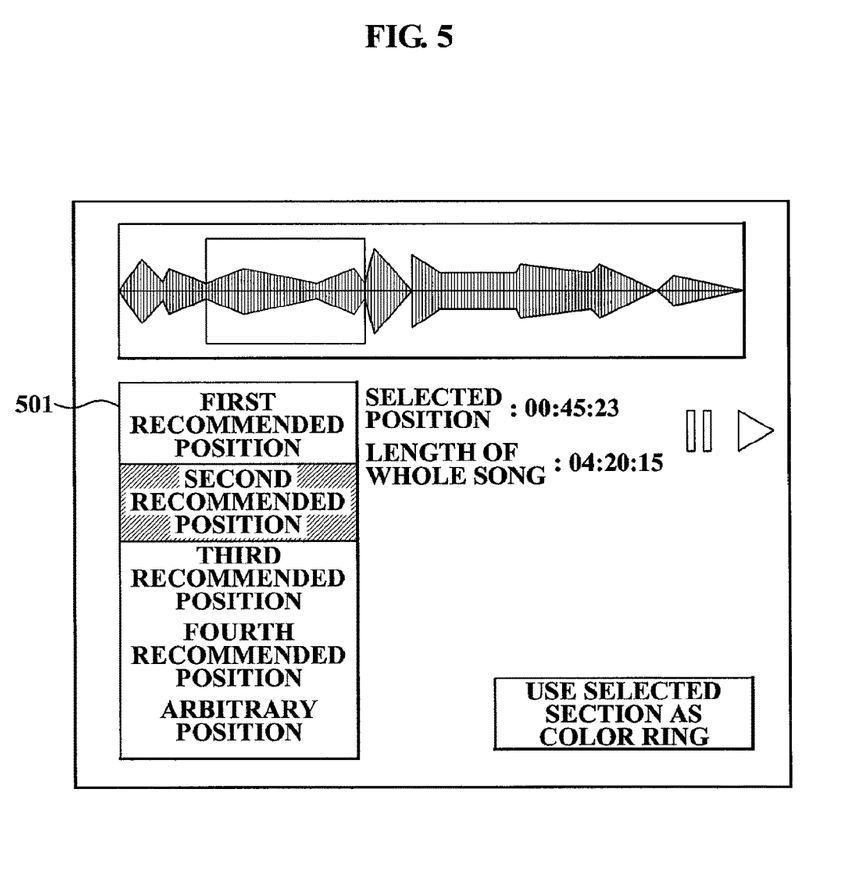
FIG. 5 illustrates a user interface for providing recommended output position information according to an exemplary embodiment of the present invention.

FIG. 5 illustrates a user interface for providing recommended output position information according to an exemplary embodiment of the present invention. Referring to FIG. 5, the RBT providing system can provides recommended output position information 501 of the sound file selected by a user to an interface of the user terminal.

The recommended output position information may be, in a statistical manner, either an output position having been selected by other users more than a fixed number of times with reference to the number having been selected as output position information, or an output position selected and registered by a content provider. Also, the recommended output position information may be an output position automatically selected by considering the change of the sound file (for example, change in a part where sound volume is abruptly increased, and the like).

For example, according to the RBT providing system of the invention, recommended output positions of the sound file selected by a user, that is, a "first recommended position", a "second recommended position", a "third recommended position", and a "fourth recommended position" are provided to an interface of the user terminal as recommended output position information. Also, when a user selects the first recommended position after listening to regions corresponding to the recommended positions, the selected first recommended position is recorded in a user database as recommended output position information, and the region corresponding to the first recommended output position is reproduced upon providing an RBT.

Therefore, the RBT providing system of present invention recommends either the output position having been selected by many users in a statistical manner to the user, or the output position having been adequately determined by the content provider to the user, thereby inducing the user to select an output position.

Furthermore, in order to separately manage sound files of users having selected the same output position, the RBT providing system of the invention records a user identifier of users having selected the same recommended output position information in the user database when users select one among a plurality of recommended output position information from a user interface, generates the region corresponding to the same recommended output position information from a sound file as a shared sound file, and stores the generated the region in a sound file storage.

For example, in the case where both of users corresponding to respective user identifiers "138723" and "177232" select an output position information of 25.3 seconds in the sound corresponding to a sound identifier "33276", a region between 25.3 seconds to 1 minute and 5.3 seconds of a sound identifier "33476" is generated as a shared sound file so as to be stored in the sound file storage.

The RBT providing system of the invention provides a shared sound file as an RBT by referring to the user database and the sound file storage, upon providing an RBT to the communication terminals of users corresponding to respective user identifiers "138723" and "177232".

Thus, according to the RBT providing system of the invention, many users are induced into selecting an equivalent output position by the recommending of the output position, and a shared sound file is generated so as to be commonly managed, so that data storage volume required for providing an RBT can be reduced.

For example, when a sound file has a form of a 32 Kbps ADPCM format and is 40 seconds in the length of its outputted region, the number of users using an RBT is 2,000,000, the number of selected sounds per user is an average of two per user, and 90% of users select one among three positions of 30,000 popular songs, and the remaining users select different positions of different songs, data storage volume required for providing an RBT will be 78.4 GB. As a result, less than ⅛ of the data storage volume enables the RBT service to be provided in comparison with that of a method of separately storing sounds selected by a user.

Conversely, since taste for music of users is changed over time, the number of users having selected equivalent output position information is recorded in the user database. When the number is smaller than a predetermined number, the shared sound file is either deleted in the sound file storage or recorded in the sound file storage as a file to be preferentially deleted, so that the shared sound file not having been selected more than a predetermined number is deleted, thereby reducing data storage volume required for providing an RBT.

For example, when the number of users, to whom a shared sound file is provided as an RBT by selecting equivalent output position information, is a zero, the shared sound file is either immediately deleted or recorded as a file to be preferentially deleted. As a result, when the remaining data storage volume is decreased below a certain level, the shared sound file is deleted, thereby significantly reducing data storage volume required for providing an RBT.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 6:
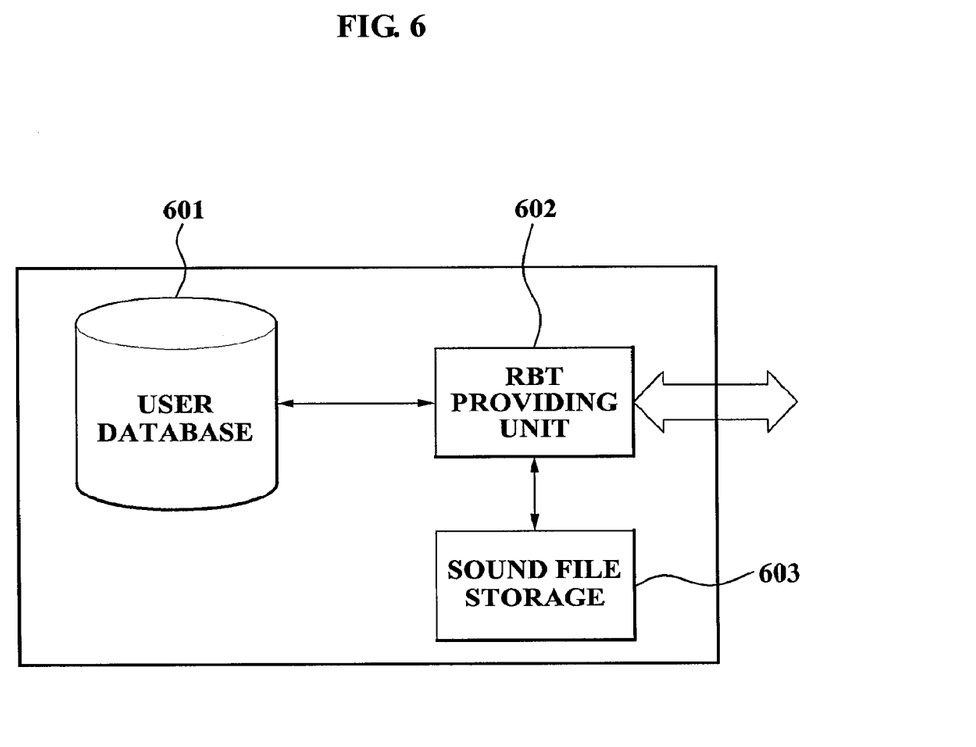
FIG. 6 is a block diagram illustrating a configuration of the RBT providing system according to an exemplary embodiment of the present invention.

FIG. 6 is a block diagram illustrating a configuration of the RBT providing system according to an exemplary embodiment of the present invention. Referring to FIG. 6, the RBT providing system of the invention may comprise a user database 601, an RBT providing unit 602, and a sound file storage 603.

The user database 601 receives sound selection information from a user terminal, records a sound identifier of the sound file corresponding to the sound selection information, receives output position information of the sound file selected from the user terminal, and stores the received output position information thereon.

The RBT providing unit 602 reproduces a region corresponding to the output position information from the sound file corresponding to the sound identifier with reference to the sound file storage 603 and the user database so as to be provided as an RBT.

The RBT providing unit 602 determines whether the selected sound file is stored in the sound file storage, downloads the selected sound file from a total song storage including the selected sound file when the selected sound file is not stored in the sound file storage, and converts the selected sound file into a predetermined format to store the converted sound file in the sound file storage.

According to an exemplary embodiment of the present invention, the sound file is configured as a packet unit, and the RBT providing unit reproduces a predetermined section from a packet unit that is closest to the output position among the sound files so as to be provided as an RBT.

Further, the RBT providing unit applies a fade-in filter to a region corresponding to the output position information, and reproduces the region with the fade-in filter applied so as to be provided as an RBT.

In addition, the RBT providing unit transmits recommended output position information of the sound file corresponding to the sound selection information from the user terminal, receives the recommended output position information which is selected from the user terminal by a user, and records the received recommended output position information in the user database as the output position information.

The recommend output position information is determined either by referring to the number of selections as the output position information or by considering the change of sound volume of the sound file.

The sound file storage 603 stores a plurality of sound files thereon, which are stored in units of song pieces.

Also, according to another exemplary embodiment of the present invention, a system for providing an RBT to a user comprises a user database 601, and an RBT providing unit 602. The user database 601 transmits recommended output position information to a user terminal, and records a user identifier of users having selected equivalent recommended output position information thereon.

The RBT providing unit 602 reproduces a region corresponding to the same recommended output position information from the sound file as a shared sound file to be stored in the sound file storage, and providing the shared sound file to the RBT of users having selected the same recommended output position information with reference to the user database and the sound file storage.

In this instance, the RBT providing unit 602 records the number of users having selected the same output position information in the user database, and either deletes the shared sound file from the sound file storage or records the shared sound file as a file to be preferentially deleted in the sound file storage when the number of users is lower than a predetermined number.

As described above, according to the present invention, a region selected by a user from the sound file selected by the user is provided as an RBT, and also the sound file of the region selected by the user is not additionally stored, so that data storage volume required for providing an RBT can be significantly reduced.

Further, according to the present invention, fade-in effect is reproduced in real-time while a specific region of a sound file is provided as an RBT by significantly reducing the data storage volume, so that the RBT can be provided to a user without making the user feel discomfort or surprised.

Also, according to the present invention, a predetermined section is reproduced from a packet unit that is closest to the output position among the sound files so as to be provided as the RBT, so that random access can be available even in the file in which independent sample data is not recorded in a byte unit.

Further, according to the present invention, many users are induced to select the same output position by recommending an output position, as well as a shared sound file is generated and commonly managed, so that data storage volume required for providing an RBT can be significantly reduced.

Still, according to the present invention, when the number of users using a shared sound file is decreased, the shared sound file is either deleted or set as a file to be preferentially deleted, so that data storage volume required for providing an RBT can be significantly reduced.

Heretofore, an RBT providing system according to the present invention has been described, and since technical features described in the above exemplary embodiments may be naturally applied to the RBT providing system of FIG. 6, the detail description will be omitted hereinafter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system for allowing a user to select a ringback tone (RBT) to be provided to a caller, the system comprising:
   a communication interface configured to:
   receive a selection of a sound file from the user,
   transmit an indication of a recommended portion of the selected sound file to the user, wherein the indication of the recommended portion has been received from a content provider, and wherein the indication of the recommended portion corresponds to a region of the selected sound file that comprises a beginning and an end and is shorter than the entire selected sound file, and receive the indication of the recommended portion from the user; and a storage device configured to:
store indications of users selecting the recommended portion, and
store the region of the selected sound file as a shared sound file for sharing by a plurality of users without additionally storing the selected sound file, wherein the indications of the users selecting the recommended portion are stored in reference to the region of the selected sound file, wherein the communication interface is further configured to reproduce the region of the selected sound file as an RBT for the caller, and the storage device is further configured to record the number of users having selected the same output position information, and either delete the shared sound file from the storage device or record the shared sound file as a file to be preferentially deleted from the storage device when the number of users is lower than a predetermined number; and wherein the storage device is further configured to delete files recorded as being preferentially deleted in response to detecting that remaining storage space is below a predetermined threshold.

2. The system of claim 1, wherein the communication interface is further configured to determine whether the region of the selected sound file is stored in the storage device, download the selected sound file from a total song storage when the region of the selected sound file is not stored in the storage device, and convert the region of the selected sound file into a predetermined format to store the converted sound file in the sound file storage.

3. The system of claim 1, wherein the communication interface applies a fade-in filter to the region, and reproduces the region with the fade-in filter applied so as to be provided as an RBT.

4. The system of claim 1, wherein the communication interface is configured to store indications of users by storing user identifiers for the users with a sound identifier for the stored region of the selected sound file.

5. The system of claim 1, wherein the communication interface is configured to transmit the indication of the recommended portion of the selected sound file to the user with audio corresponding to the recommended portion.

6. A method for allowing a user to select a ringback tone (RBT) to be provided to a caller, the method comprising:
receiving a selection of a sound file from the user;
transmitting an indication of a recommended portion of the selected sound file to the user, wherein the indication of the recommended portion has been received from a content provider, and wherein the indication of the recommended portion corresponds to a region of the selected sound file that comprises a beginning and an end and is shorter than the entire selected sound file;
receiving the indication of the recommended portion from the user;
recording the indication of the recommended portion and user identifiers of users selecting the recommended portion; and
generating the region of the selected sound file as a shared sound file for sharing by a plurality of users, the shared sound file to be stored in a storage device without additionally storing the selected sound file;
providing the shared sound file to the caller as the RBT of the user; and
recording the number of users having selected the same output position information, and either deleting the shared sound file from the storage device or recording the shared sound file as a file to be preferentially deleted from the storage device when the number of users is lower than a predetermined number.

7. The method of claim 6, wherein generating the region of the selected sound file as the shared sound file comprises downloading the selected sound file from a total song storage, and converting the region of the selected sound file into a predetermined format.

8. The method of claim 6, wherein generating the region of the selected sound file includes applying a fade-in filter to the region and providing the shared sound file with the fade-in filter applied as an RBT.

9. The method of claim 6, further comprising deleting files recorded as being preferentially deleted in response to detecting that remaining storage space is below a predetermined threshold.

10. The method of claim 6, wherein transmitting the indication of the recommended portion comprises transmitting the indication of the recommended portion of the selected sound file to the user with audio corresponding to the recommended portion.

11. A non-transitory computer-readable storage medium storing a program for implementing a method for allowing a user to select a ringback tone (RBT) to be provided to a caller, the method comprising:
receiving a selection of a sound file from the user;
transmitting an indication of a recommended portion of the selected sound file to the user, wherein the indication of the recommended portion has been received from a content provider, and wherein the indication of the recommended portion corresponds to a region of the selected sound file that comprises a beginning and an end portion and is shorter than the entire selected sound file; and
receiving the indication of the recommended portion from the user;
storing indications of users selecting the recommended portion, and storing the region of the selected sound file as a shared sound for sharing by a plurality of users file without additionally storing the selected sound file, wherein the indications of the users selecting the recommended portion are stored in reference to the region of the selected sound file;
reproducing the region of the selected sound file as an RBT for the caller; and
recording the number of users having selected the same output position information, and either deleting the shared sound file from the storage device or recording the shared sound file as a file to be preferentially deleted from the storage device when the number of users is lower than a predetermined number.

12. The non-transitory computer-readable storage medium of claim 11, wherein generating the region of the selected sound file as the shared sound file comprises downloading the selected sound file from a total song storage, and converting the region of the selected sound file into a predetermined format.

13. The non-transitory computer-readable storage medium of claim 11, wherein generating the region of the selected sound file includes applying a fade-in filter to the region and providing the shared sound file with the fade-in filter applied as an RBT.

14. The non-transitory computer-readable storage medium of claim 11, wherein storing indications of users comprises storing user identifiers for the users with a sound identifier for the stored region of the selected sound file.

15. The non-transitory computer-readable storage medium of claim 11, wherein the method further comprises deleting files recorded as being preferentially deleted in response to detecting that remaining storage space is below a predetermined threshold.

16. The non-transitory computer-readable storage medium of claim 11, wherein transmitting the indication of the recommended portion comprises transmitting the indication of the recommended portion of the selected sound file to the user with audio corresponding to the recommended portion.

\* \* \* \* \*